US011712924B2

(12) United States Patent
Peterson et al.

(10) Patent No.: US 11,712,924 B2
(45) Date of Patent: Aug. 1, 2023

(54) CASTER ASSEMBLY

(71) Applicant: Superior Tire and Rubber Corp., Warren, PA (US)

(72) Inventors: Joseph J. Peterson, Warren, PA (US); Kyle R. Knotowicz, Jamestown, NY (US); Phillip M. Downey, Tidioute, PA (US)

(73) Assignee: Superior Tire and Rubber Corp., Warren, PA (US)

( * ) Notice: Subject to any disclaimer, the term of this patent is extended or adjusted under 35 U.S.C. 154(b) by 16 days.

(21) Appl. No.: 17/096,540

(22) Filed: Nov. 12, 2020

(65) Prior Publication Data
US 2021/0138835 A1    May 13, 2021

Related U.S. Application Data

(60) Provisional application No. 62/934,811, filed on Nov. 13, 2019.

(51) Int. Cl.
*B60B 33/04* (2006.01)
*B60B 33/00* (2006.01)
*B66F 9/075* (2006.01)

(52) U.S. Cl.
CPC ........ *B60B 33/045* (2013.01); *B60B 33/0002* (2013.01); *B60B 33/0068* (2013.01); *B66F 9/07572* (2013.01); *B60B 33/0039* (2013.01); *B60B 33/0049* (2013.01); *B60B 33/0057* (2013.01); *B60B 2200/00* (2013.01); *B60B 2320/10* (2013.01); *B60B 2360/10* (2013.01); *B60B 2360/32* (2013.01); *B60B 2380/12* (2013.01); *B60B 2900/141* (2013.01); *B60B 2900/531* (2013.01); *B60B 2900/541* (2013.01); *B60B 2900/561* (2013.01); *B62B 2301/20* (2013.01)

(58) Field of Classification Search
CPC ....... B60B 33/04; B60B 33/06; B60B 33/045; B60B 33/0002; B60B 33/0068
See application file for complete search history.

(56) References Cited

U.S. PATENT DOCUMENTS

| 1,552,790 | A |   | 9/1925  | Zinsitz  |           |
|-----------|---|---|---------|----------|-----------|
| 1,686,894 | A | * | 10/1928 | Buckert  | B60B 33/06 |
|           |   |   |         |          | 16/33     |

(Continued)

FOREIGN PATENT DOCUMENTS

| CN | 108657257 | A | * | 10/2018 |
|----|-----------|---|---|---------|
| CN | 108891202 | A | * | 11/2018 |

(Continued)

*Primary Examiner* — Emily M Morgan
(74) *Attorney, Agent, or Firm* — Boardman & Clark LLP

(57) ABSTRACT

A spring-force adjustable, height-adjustable industrial caster assembly including a mounting plate, a swivel housing that swivels relative to the mounting plate, and a spring assembly having components that are moveable relative to the swivel housing to controllably alter spring deflection and/or caster wheel height, which components can be adjusted by accessing the height-adjustable industrial caster assembly from above, eliminating the need to raise a pallet truck or other moveable assembly to which the caster assembly is coupled, away from the floor to be able to access and adjust the industrial caster assembly.

17 Claims, 10 Drawing Sheets

(56) References Cited

U.S. PATENT DOCUMENTS

| | | | |
|---|---|---|---|
| 1,745,992 A | | 2/1930 | Herold |
| 2,442,831 A | * | 6/1948 | Suttles .................. B60B 33/045 16/31 R |
| 2,707,795 A | * | 5/1955 | Skupas .................. B60B 33/045 267/72 |
| 2,738,542 A | | 3/1956 | Clark |
| 2,879,075 A | * | 3/1959 | Wallace .................. B60B 33/06 280/43.23 |
| 2,915,776 A | * | 12/1959 | Hanson .................. B60B 33/045 16/21 |
| 3,032,805 A | * | 5/1962 | Skupas .................. B60B 33/045 267/2 |
| 3,041,656 A | | 7/1962 | Goodall |
| 3,216,048 A | * | 11/1965 | Jespersen ................ B60B 33/08 16/37 |
| 3,518,714 A | | 7/1970 | Hager |
| 3,827,104 A | | 8/1974 | Lambertz |
| 4,006,513 A | | 2/1977 | Offterdinger |
| 4,029,311 A | | 6/1977 | Chanslor et al. |
| 4,189,870 A | | 2/1980 | Helmick |
| 4,260,177 A | | 4/1981 | Pflughaupt et al. |
| 4,346,498 A | | 8/1982 | Welsch et al. |
| 4,462,138 A | | 7/1984 | Black |
| 4,485,521 A | | 12/1984 | Welsch et al. |
| 4,559,669 A | * | 12/1985 | Bonzer .................. B60B 33/045 16/44 |
| 4,722,114 A | | 2/1988 | Neumann |
| 4,763,910 A | | 8/1988 | Brandli et al. |
| 5,109,569 A | * | 5/1992 | Shaw .................... B60B 33/045 16/44 |
| 5,347,680 A | * | 9/1994 | Rippe ................... B60B 33/045 16/18 R |
| 5,400,469 A | * | 3/1995 | Simonsen ............. B60B 33/045 16/20 |
| 5,403,031 A | | 4/1995 | Gottschalk et al. |
| 5,448,796 A | | 9/1995 | Larson |
| 5,809,612 A | | 9/1998 | Finch |
| 6,113,117 A | | 9/2000 | Mimura |
| 6,149,169 A | | 11/2000 | Chelgren |
| 6,279,199 B1 | | 8/2001 | Plate |
| 6,425,161 B1 | * | 7/2002 | LeMeur, Jr. .......... B60B 33/045 16/45 |
| 6,484,359 B1 | * | 11/2002 | Guttmann ............. B60B 33/045 16/35 R |
| 6,499,184 B2 | | 12/2002 | Plate |
| 6,539,578 B1 | * | 4/2003 | Guttmann ........... B60B 33/0049 16/44 |
| 7,065,828 B2 | | 6/2006 | Sorensen |
| 7,093,319 B2 | | 8/2006 | Lemeur et al. |
| 7,182,179 B2 | | 2/2007 | Tolfsen |
| 7,231,689 B2 | | 6/2007 | Scheiber et al. |
| 7,284,299 B2 | | 10/2007 | Ruckman et al. |
| 7,353,566 B2 | | 4/2008 | Scheiber et al. |
| 8,155,918 B2 | | 4/2012 | Reed et al. |
| 8,251,391 B2 | | 8/2012 | Kohler et al. |
| 8,267,412 B2 | | 9/2012 | Liu |
| 8,424,887 B1 | * | 4/2013 | LeMeur, Jr. ............ B60B 33/04 16/45 |
| 8,499,414 B1 | * | 8/2013 | LeMeur, Jr. ........ B60B 33/0023 16/24 |
| 8,839,487 B2 | | 9/2014 | Plate |
| 10,118,440 B1 | * | 11/2018 | Schenk ............... B60B 33/0078 |
| 10,155,415 B1 | * | 12/2018 | Lu ........................ B60B 33/045 |
| 10,518,578 B1 | * | 12/2019 | Spektor .................. B60B 33/06 |
| 2002/0190492 A1 | * | 12/2002 | Strong ..................... B60G 3/14 280/124.128 |
| 2003/0061681 A1 | * | 4/2003 | Plate .................... B60B 33/0068 16/19 |
| 2004/0000025 A1 | | 1/2004 | Lemeur et al. |
| 2004/0055108 A1 | * | 3/2004 | Lemeur, Jr. ........... B60B 33/045 16/44 |
| 2004/0111830 A1 | * | 6/2004 | Cooper ................. B60B 33/045 16/44 |
| 2007/0039786 A1 | * | 2/2007 | Willis .................. B60B 33/0089 188/19 |
| 2009/0165207 A1 | | 7/2009 | Reed et al. |
| 2009/0205164 A1 | * | 8/2009 | Larson .................. B60B 33/045 16/44 |
| 2014/0109341 A1 | * | 4/2014 | Plate .................... B60B 33/045 16/19 |
| 2015/0274496 A1 | * | 10/2015 | Goncalves ............ B62B 3/0612 280/124.136 |
| 2019/0077193 A1 | * | 3/2019 | Chang .................. B60B 33/045 |
| 2019/0145482 A1 | * | 5/2019 | Nakazato ................ F16F 13/04 267/195 |
| 2021/0229491 A1 | * | 7/2021 | McKay ............... B60B 33/0076 |

FOREIGN PATENT DOCUMENTS

| | | | | |
|---|---|---|---|---|
| CN | 111038175 A | * | 4/2020 | |
| FR | 2399328 A1 | * | 8/1977 | |
| GB | 936908 A | * | 2/1964 | |
| WO | WO-02092408 A1 | * | 11/2002 | ......... B60B 33/0002 |

* cited by examiner

CASTER ASSEMBLY

CROSS-REFERENCE TO RELATED APPLICATIONS

This application claims priority to U.S. Provisional Patent Application Ser. No. 62/934,811, filed Nov. 13, 2019, the content of which is hereby incorporated herein by reference in its entirety.

FIELD

The present inventions relate to the field of industrial casters. The present inventions more specifically relate to the field of height adjustable, spring force adjustable industrial caster assemblies.

BACKGROUND

Industrial caster assemblies and wheels are used, for example, as stabilizer casters on a pallet truck. Typical pallet trucks have a single drive wheel and one industrial caster wheel located at each corner. Usually, each industrial caster assembly has a spring member that absorbs shocks while traveling. The spring member also provides stability as the object to which the height-adjustable industrial caster wheel is attached travels over rough surfaces. U.S. Pat. Nos. 6,425,161; 7,093,319; 8,424,887; and 8,499,414, each of which is incorporated herein by reference in its entirety, disclose industrial caster wheels having elastomeric spring members.

Pallet trucks are used for a variety of tasks, such as moving pallets between a loading dock and a shipping container or semitrailer, or between the loading dock and a storage or redistribution location. When a pallet truck is used to move pallets from the loading dock into the shipping container or semitrailer or from the shipping container or semitrailer onto the loading dock, the operator typically runs the pallet truck at low speeds, due to the limited spaces in the shipping container or semitrailer and/or the loading dock and the typical height offsets between the surface of the loading dock and bottom surface of the shipping container or semitrailer.

One of the operator's primary concerns is to avoid damaging or dislodging any of the goods placed on the pallet as the pallet is being moved. As a result of these considerations, the spring-force adjustable and/or height-adjustable industrial caster assemblies are typically set to provide a relatively soft spring force and to allow the pallet truck to move over uneven surfaces while maintaining the pallet in a relatively steady position and relatively horizontal orientation.

In contrast, after a given pallet has been moved onto the loading dock, other pallet trucks may be used to move the pallet to a storage location, a redistribution location and/or another loading dock. For example, upon receiving a number of pallets from a manufacturer at an inbound loading dock of a warehouse, each containing the same goods, some of those pallets may be immediately transferred to a number of outbound loading docks, with each pallet being moved to a different loading dock for shipping to a different retail store. Other ones of those pallets may be moved to storage shelves, where they will be stored until they are shipped to the various retail stores. In another example, those pallets may be moved to a redistribution location, where the various goods are unloaded from the pallets and either placed into storage or repalletized with other goods from other manufacturers and/or other goods from the same manufacturer for delivery to a single retail store.

In these cases, the pallet trucks typically move on a smooth, even floor of the warehouse. One of the operator's primary concerns is to move the pallets rapidly while minimizing any tipping over, damaging, or dislodging of goods on the pallet. Thus, in these cases, the operators tend to run the pallet trucks at relatively higher speeds along defined paths. These paths tend to unavoidably include turns, sharp corners and/or moving from one path to another. As a result of these considerations, the spring-force adjustable and/or height-adjustable industrial caster assemblies are typically set to provide a relatively stiff spring force and/or to allow the pallet truck to take high-speed turns over relatively even surfaces while avoiding tipping over the pallet truck and/or maintaining the pallet sufficiently steady and/or horizontal.

Typically, a warehouse will employ a large number of pallet trucks, some of which will be used to move pallets between the loading docks and shipping containers and/or semitrailers, others of which will be used to move pallets between the loading docks, storage locations and/or redistribution locations, and still others of which are in a repair bay or the like for repairs or other maintenance. Some such repairs or other maintenance actions include replacing worn drive wheels and/or worn industrial casters.

In addition, as fork lift or pallet truck drive wheels wear, the caster assemblies require adjustment to have optimal or desired pre-deflection from the ground. Such caster adjustment is typically made based on a height setting, and the drive wheel of the pallet truck is driven over a plate or shim (e.g., a 0.25" plate) to help suspend the caster wheels off the ground a certain height (e.g., 0.25") so that the caster assembly may be adjusted downward until the caster wheels contact the ground. The drive wheel is then moved off the plate or shim to provide the caster assembly a pre-deflection generally corresponding to the height of the plate or shim (e.g., 0.25"). This adjustment process is tedious, awkward for the adjuster who many times will need to adjust the caster assembly from the floor. It also requires time and sometimes taking the pallet truck out of operation.

SUMMARY

Customers in the material handling industry prefer and even need adjustable height on their casters to maintain good stability and to compensate for tire wear. The stabilizing casters or load bearing casters are typically located beneath the fork truck, thereby having requirements for maximum size, height, and swing. A compact design is beneficial to produce a low overall caster assembly height. Condensing the functions and features of a caster to share locations in the design would free up space that would typically house discreet parts of the caster in other designs. It may also protect the spring from the elements and environment if it is located within the caster assembly.

In response to a given pallet truck breaking down and needing to be pulled off-line and sent to the repair bay, it is not uncommon for another pallet truck to be moved from a loading/unloading task to a transfer task or vice-versa. This can also occur when additional pallet trucks are needed to deal with higher than normal amounts of inbound or outbound goods or to deal with higher than normal amounts of goods needing to be transferred between loading docks, storage locations, redistribution locations and the like. In such cases, it is typically desirable or necessary to adjust the spring stiffness of the height-adjustable industrial caster assembly and may be necessary or desirable to adjust the height of the caster assembly or wheel to the different use. As discussed above, it may also be desirable or necessary to adjust the height of the caster assembly to create new or additional pre-deflection as the drive wheel wears.

This disclosure provides a caster assembly with a novel spring design in which the spring assembly providing dampening/cushioning/suspension is located mostly within the main body of the caster, preferably within the diameter of the bearings, and at an elevation near or about the bearing axis.

This disclosure provides an improved spring member and spring member assembly for a spring-force-adjustable industrial caster assembly.

This disclosure provides an improved spring member for a spring-force-adjustable industrial caster assembly where the spring-force-adjusting mechanism applies the spring force adjustment force to the spring member in a direction that is at least similar to or substantially the same as an applied force direction of the spring-force-adjustable industrial caster assembly.

This disclosure provides an improved spring member for a spring-force-adjustable industrial caster assembly where both the spring-force-adjustment force and the applied load are applied to a top-to-bottom direction of the spring member.

This disclosure provides an improved spring member assembly for a spring-force-adjustable industrial caster assembly that has the spring-force-adjusting mechanism located and accessible at or near a top surface of or above the spring-force-adjustable industrial caster wheel.

This disclosure provides an improved spring-force-adjustable industrial caster assembly that laterally contains a spring member within a spring space of the swivel housing the spring-force-adjustable industrial caster wheel.

This disclosure provides for torque adjustable or torque setting adjustment feature that allows for adjustment using access from the top deck of the fork or pallet truck using a torque value (and/or torque wrench), thereby reducing any need to move the drive wheel over a plate of a predetermined height to obtain a corresponding caster assembly pre-deflection. As such, the disclosure also allows ride adjustments by altering the spring deflection and may allow for different settings for and, as desired, depending upon load capacity and driving conditions. The disclosure also allow for electronically controlled and/or automatically (or semi-automatically) adjustable casters (e.g., using a drive motor and/or servo that may be integrated with truck electronics).

In various exemplary embodiments, the industrial caster wheel assembly includes a mounting plate and a swivel housing that swivels or rotates relative to the monitor mounting plate. In various exemplary embodiments, a spring assembly extends into a spring space defined by the swivel housing. In various embodiments, a spring member of the spring assembly is held within or mostly within the spring space formed within the swivel housing. In various embodiments, the spring member is deformable along the top-to-bottom direction to dampen any changes in the surface the caster wheel moves over and/or to dampen any changes in load applied to the mounting plate.

This disclosure further provides for a spring-force-adjustable, height-adjustable industrial caster assembly, comprising: a mounting base attachable to a movable device; a swivel housing rotatably coupled to the mounting base; the swivel housing defining a spring space; a spring assembly provided at least partially in the spring space; a side plate assembly coupled to the spring assembly and the swivel housing such that the side plate assembly is pivotable relative to the spring housing; whereby the spring assembly comprises spring member and a fitting, which fitting is adjustable relative to the spring housing to pre-deflect the spring member in the spring space.

These and other features and advantages of this invention are described in or are apparent from the following detailed description of the preferred embodiments.

BRIEF DESCRIPTION OF DRAWINGS

Various examples of embodiments of the systems, devices, and methods according to this invention will be described in detail, with reference to the following figures, wherein.

Figure 1:
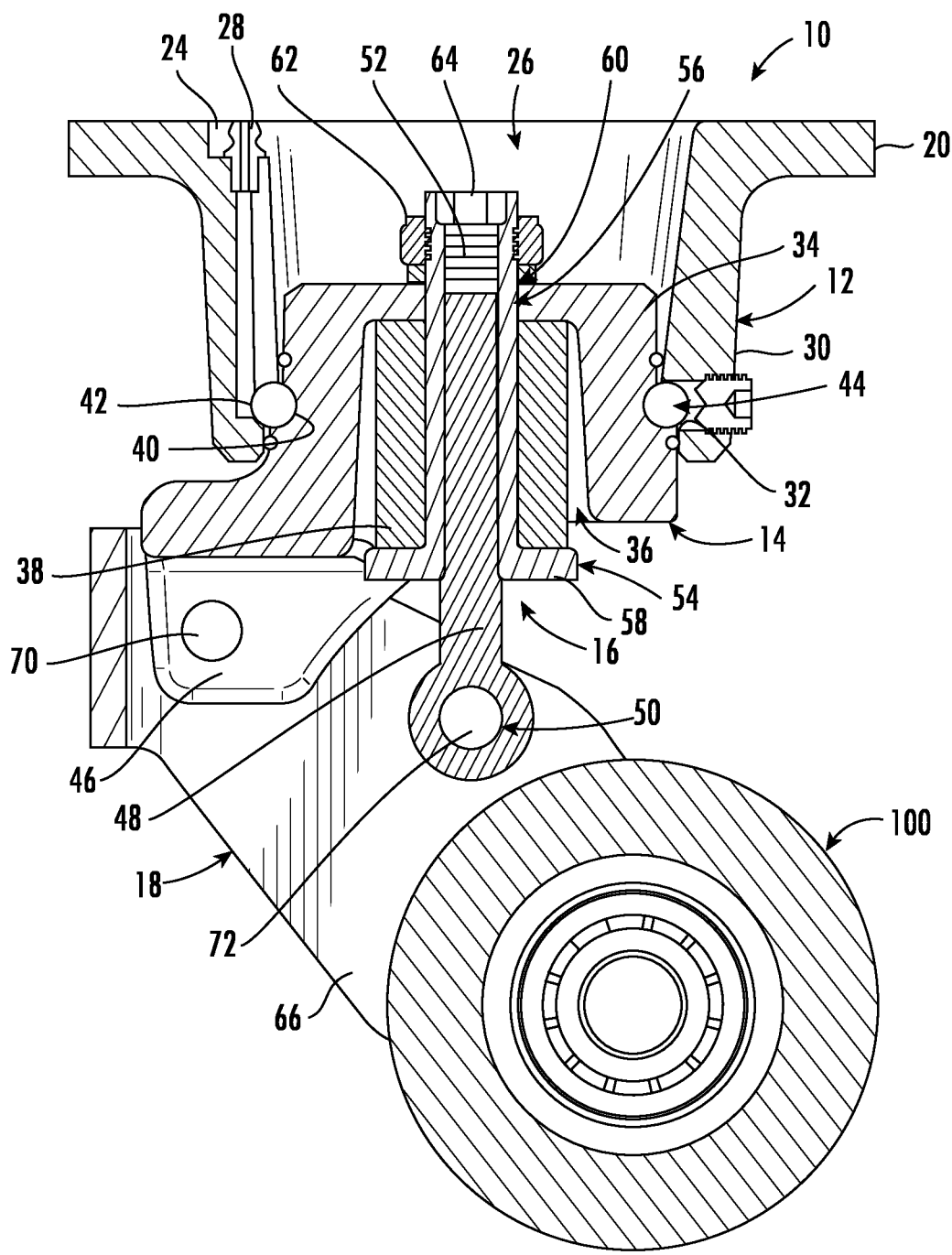
FIG. 1 illustrates a sectional side view of a caster assembly and wheel, according to various examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a caster assembly 10 and wheel assembly 100 is provided. FIGS. 1-7C illustrate an example embodiment of a spring-force-adjustable and/or height-adjustable industrial caster assembly 10. As shown in FIGS.

1-7C, the spring-force-adjustable and/or height-adjustable industrial caster assembly 10 includes a mounting base 12, a swivel housing 14, a spring assembly 16 (e.g., a spring-force-adjustable and/or height-adjustable spring assembly), and a bent or side plate assembly 18.

As shown in varying levels of detail in FIGS. 1-10, the mounting base 12 includes a top mounting plate 20. As more specifically illustrated in FIGS. 2-3 and 4-5, a plurality of holes 22 are defined or provided in top mounting plate 20 and are usable to couple or mount mounting base 12 to an object, such as a pallet truck. Mounting base 12 also defines or includes a first recess 24 and a central passage 26. A lubrication fitting 28 (e.g., a grease zerk) is provided into first recess 24.

Figure 2:
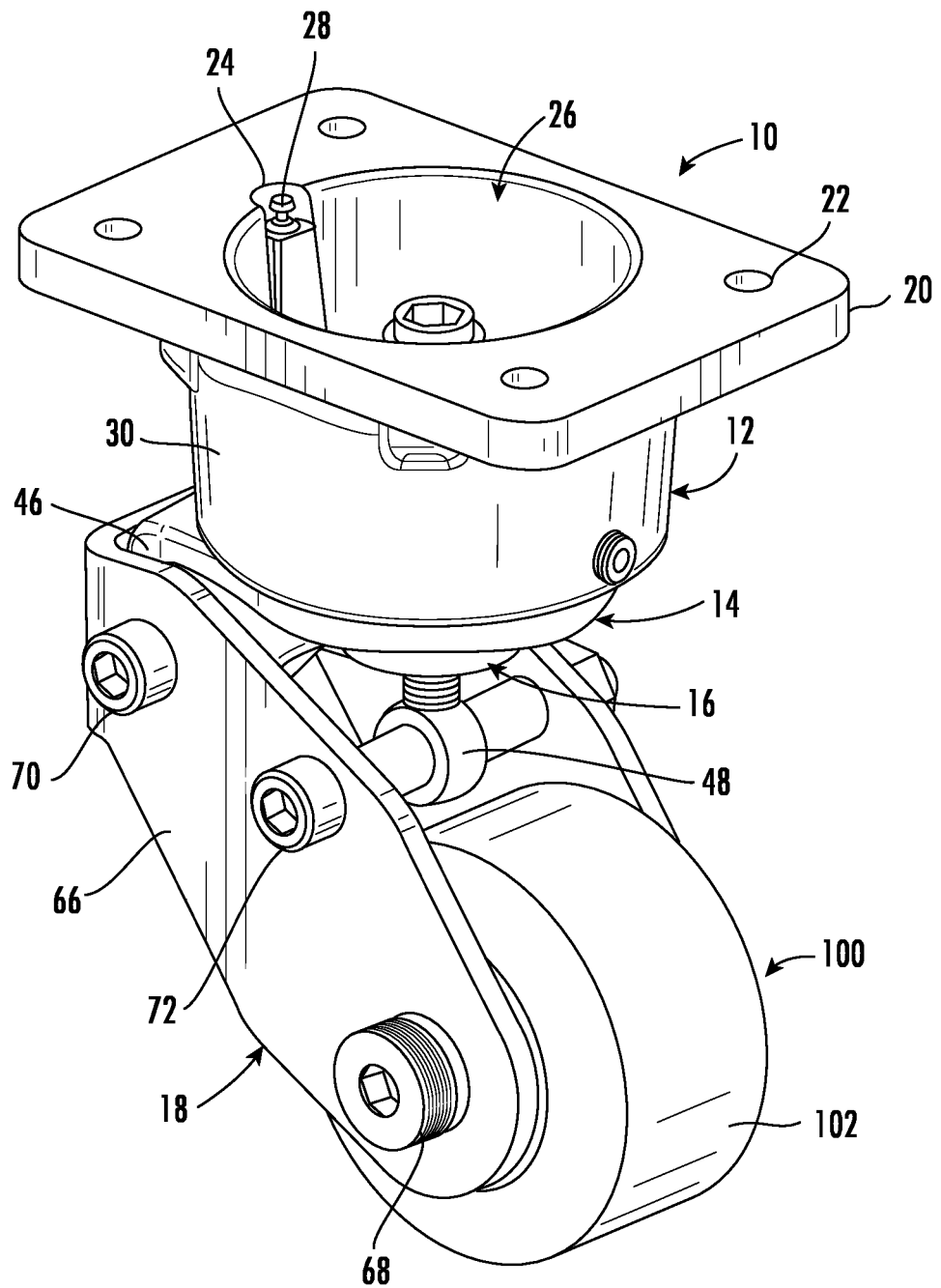
FIG. 2 illustrates a perspective view of the caster assembly and wheel of FIG. 1.
Figure 3:
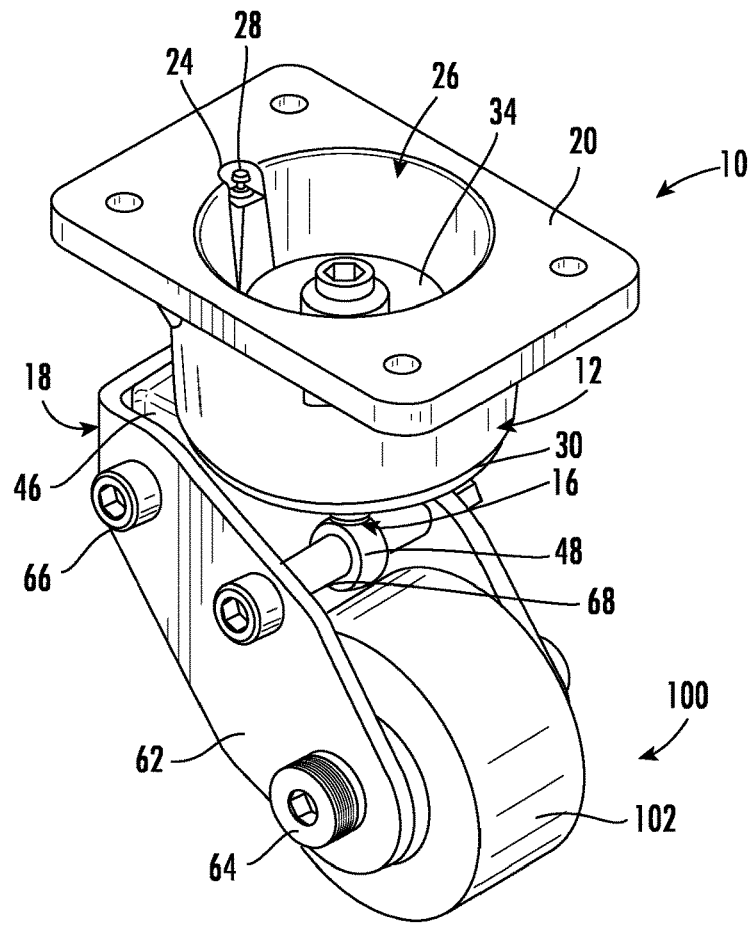
FIG. 3 illustrates a perspective view of the caster assembly and wheel of FIG. 1.
Figure 4:
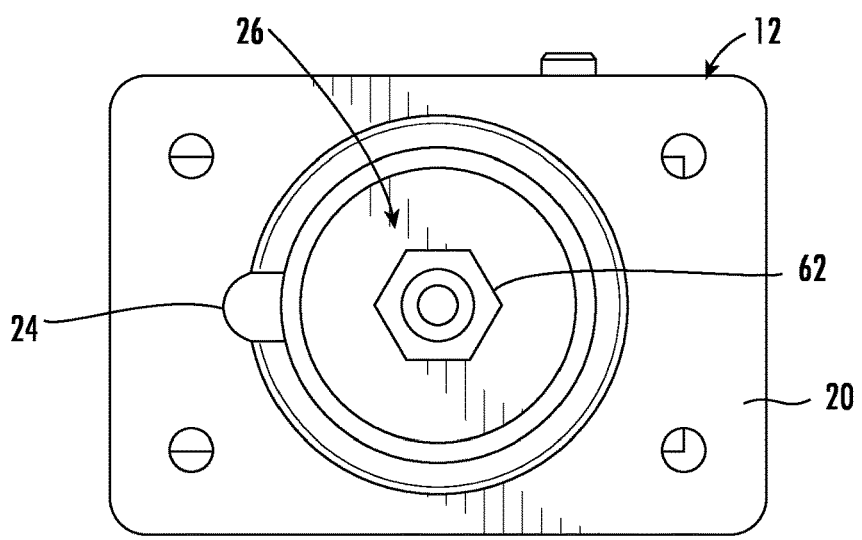
FIG. 4 illustrates a top view of the caster assembly and wheel of FIG. 1.
Figure 5:
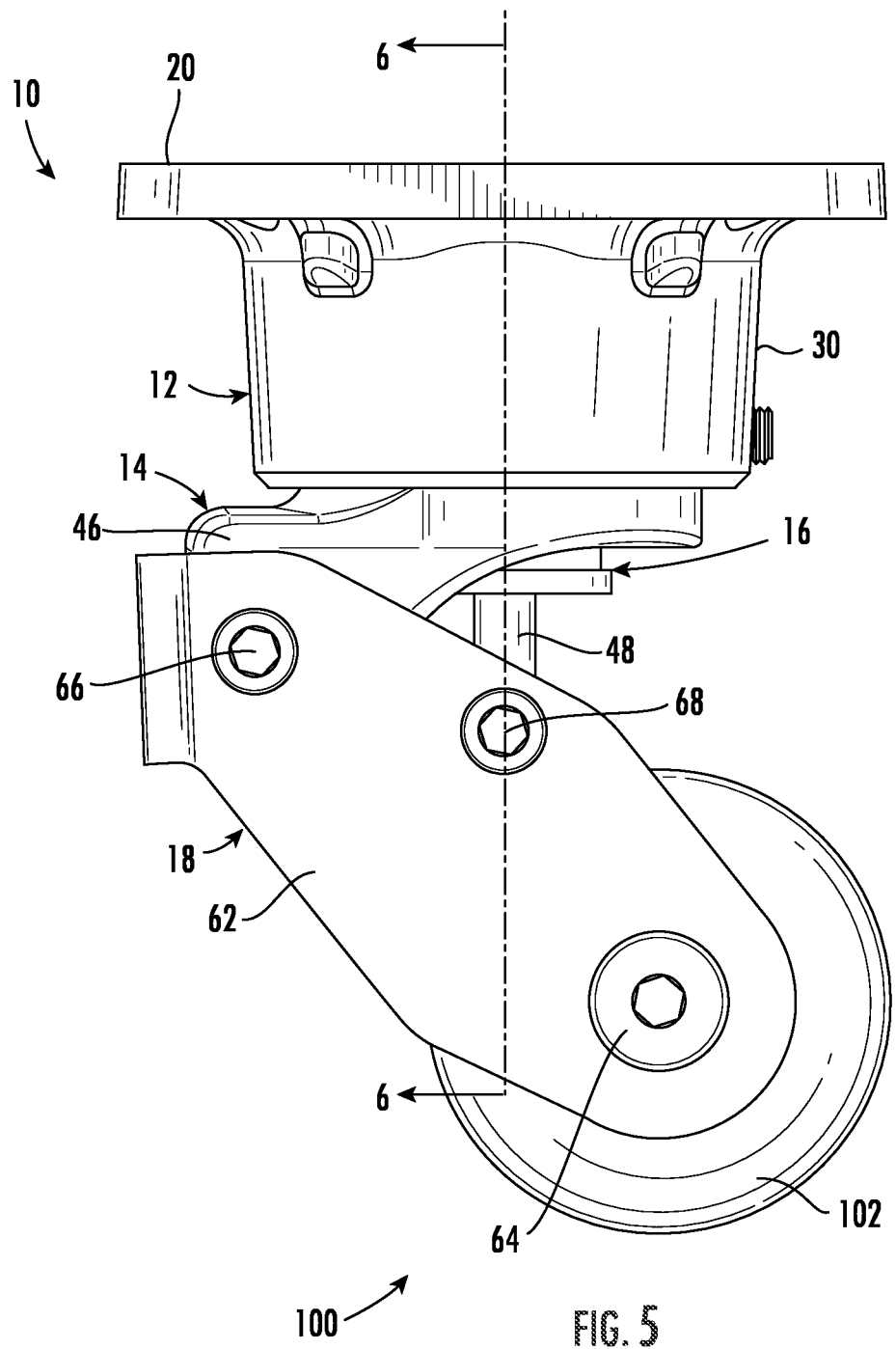
FIG. 5 illustrates the caster assembly and wheel of FIG. 1 at an assembled height, according to various examples of embodiments.
Figure 6:
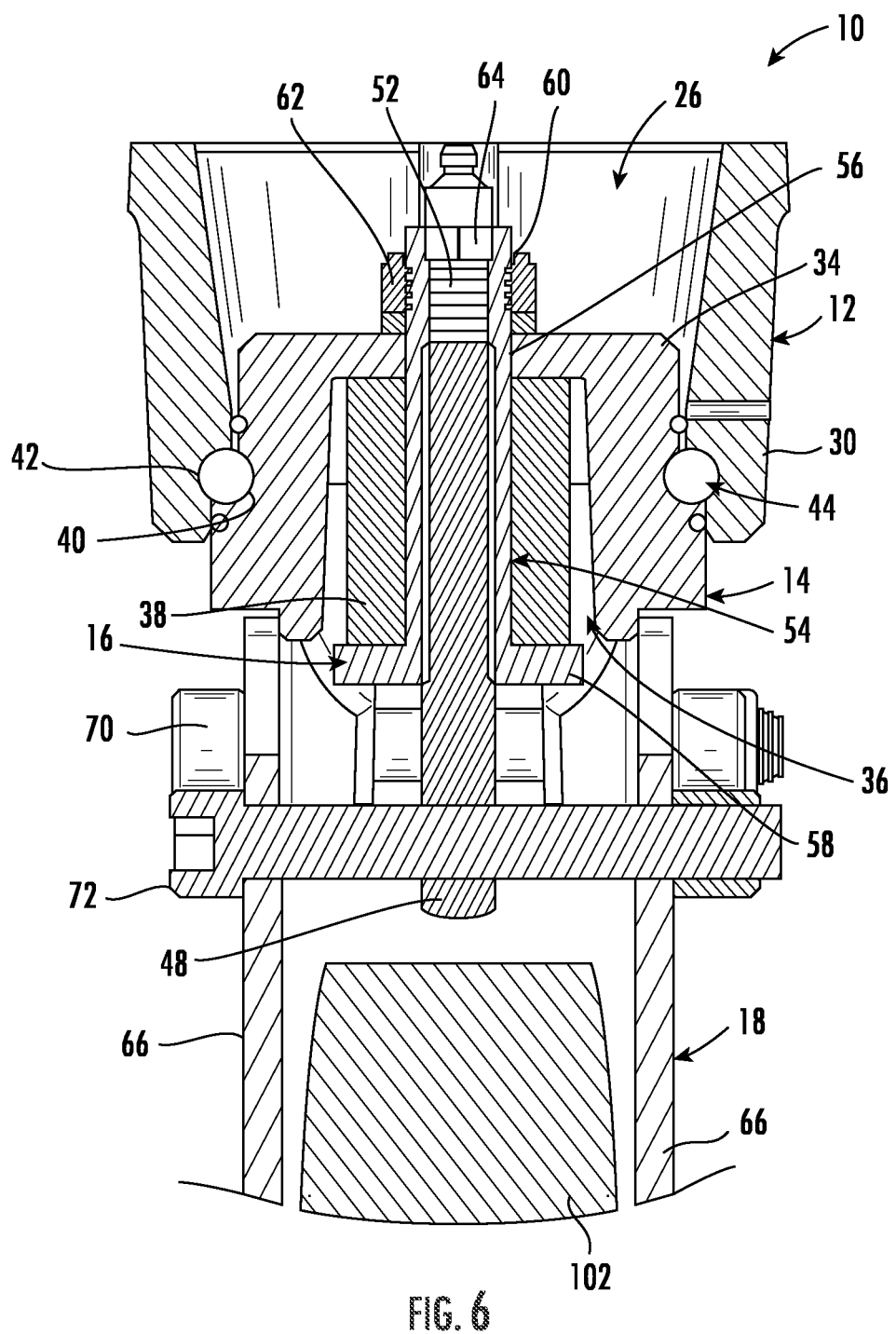
FIG. 6 illustrates a partial sectional view of the caster assembly and wheel illustrated in FIG. 5.

As shown in FIGS. 1-3, a bottom member 30 (e.g., annular bottom member) of mounting base 12 extends downwardly away from top mounting plate 20. The outer surface of bottom member 30 is typically annular or cylindrical, although it can be any appropriate or suitable shape. In various embodiments, annular bottom member 30 helps define a central passage 26 in mounting base 12. As illustrated in FIG. 1, in various embodiments, annular bottom member 30 also defines a ball bearing passage 32 extending horizontally through annular bottom member 30. In various embodiments, ball bearing passage 32 includes internal threading and a bearing ball cap or plug screw screwed into the internally threaded ball bearing passage 32.

In various embodiments, an annular top portion 34 of swivel housing 14 extends upwardly into central passage 26. In various examples of embodiments, annular top portion 34 of swivel housing 14 helps define a cavity or spring space 36. In various embodiments, swivel housing 14 is separated or spaced from annular bottom member 30 (e.g., by one or more O-rings).

In various examples of embodiments, cavity or spring space 36 defined by swivel housing 14 is conical or frustoconical in shape. It should be appreciated, however, that cavity or spring space 36 may take a variety of shapes and/or dimensions, for example, to allow a spring member 38 provided at least partially in spring space or cavity 36 and spring space or cavity 36 to be tuned in geometry to give various desirable effects such as variable spring rate (such as with a conical cavity) and over-strain protection (e.g., when cavity 36 or a lateral section of cavity 36 is full, spring member 38, being made with incompressible material, stops or nearly stops compressing). In various examples of embodiments, the spring space is sized and/or shaped relative to the size and/or shape of the spring member (e.g., at rest or in deflection) such that the spring space constrains the amount and/or direction of deflection of the spring member in response to one or more forces applied to the spring member.

As shown in FIG. 1, in various embodiments, mounting base 12 extends around the annular top portion 34 of swivel housing 14. In various embodiments, a first channel 40 is provided in an inner surface of central passage 26, and a corresponding channel 42 is formed in an outer surface of swivel housing 14. When swivel housing 14 is inserted into central passage 26, in various embodiments, the first and corresponding channels 40 and 42 face each other and form a bearing race 44 having or defining a bearing race circumference or plane, and when a number of ball bearings (e.g., a number of ball bearings sufficient to fill bearing race 44) are provided into bearing race 44 through ball bearing passage 32, swivel housing 14 is retained in central passage 26, such that swivel housing 14 is rotatably coupled to mounting base 12. The ball bearings are retained in bearing race 44 by screwing a plug screw or bearing ball cap in ball bearing passage 32.

The ball bearings allow swivel housing 14 to swivel or rotate relative to mounting base 12 about a vertical axis. In various embodiments, the one or more O-rings, provided between swivel housing 14 and mounting base 12, help seal a gap between swivel housing 14 and mounting base 12 in central passage 26, and prevent lubrication provided for the ball bearings which may be inserted into the gap through the lubrication fitting from escaping from the gap.

Swivel housing 14 also includes a mounting structure 46 for side plate assembly 18, which structure 46 extends out from the vertical axis and/or below spring member 38 of spring assembly 16.

Spring-force-adjustable and/or height-adjustable spring assembly 16 includes spring member 38. In various embodiments, spring member 38 is elastomeric. In various examples of embodiments, spring-force-adjustable and/or height-adjustable spring assembly 16 includes a rod or eyebolt 48 having opposing top and bottom portions, with an eye 50 at a bottom portion of rod 48 and external threading 52 at a top portion of rod 48.

In various embodiments, spring-force-adjustable and/or height-adjustable spring assembly 16 includes a fitting 54 (such as a stub end fitting). In various embodiments, fitting 54 includes an upper (e.g., tubular) portion 56 and a flange 58. In various embodiments, upper portion 56 of fitting 54 has a top section 60 having external threads for engaging internal threading of a pre-tensioning nut 62. In various embodiments, a springe seat 64 having internal threading is provided near top portion of rod 48 for engaging external threading 52 of rod or eyebolt 48.

In various embodiments, a middle portion and the top portion of rod or eyebolt 48 is received by upper portion 56 of fitting 54. In various embodiments, upper portion 56 of fitting 54 (e.g., a bottom section of upper portion 56 of fitting 54) is received by elastomeric spring member 38. In various embodiments, a portion (e.g., a top portion) of spring-force-adjustable and/or height-adjustable spring assembly 16 extends upwardly inside of annular bottom member 30 of mounting base 12 and annular top portion 34 of swivel housing 14.

As shown in FIG. 1, in various embodiments, spring member 38 sits or rests on flange 58 of fitting 54 within cavity or spring space 36. In various embodiments, rod 48 of spring assembly 16 is provided substantially perpendicular to a direction or plane in which a wheel 102 of wheel assembly 100 travels, to help allow fitting 54 to hold elastomeric (e.g., polymer) spring member 38 in place against or relative to swivel housing 14. In various embodiments, spring member 38 is pre-tensioned (e.g., using one or more pre-tensioning nuts 62, washers or other fasteners coupled to or otherwise engaged with threading of upper portion 56 of fitting 54) between flange 58 and top portion of cavity or spring space 36 defined by swivel housing 14.

In various embodiments, spring member 38 is a cylindrical polymer spring or material which allows for nonlinear deflection, and is advantageous for its properties and ability to adjust for wheel 102 or other components (such as the side plate assembly) hitting immovable objects.

The combination of spring member 38 and spring space 36 is advantageous for various reasons. For example, the nonlinear portion of the spring curve provided by spring member 38 and/or spring space 36 is advantageous. Because it is made from elastomeric material in various embodiments, spring member 38 is essentially incompressible, and shortening and lengthening the spring member in a top-to-bottom direction or dimension requires that spring member 38 increase, decrease and/or otherwise deflect, respectively, in one or multiple lateral, i.e., front-to-back or side-to-side, directions or dimensions of spring member 38 to maintain the same volume. As deflection is increased, polymer spring member 38 further fills spring space 36, and, in various embodiments, the force to deflect increases exponentially.

In various embodiments, spring member 38 is made of a polymer. A polymer spring member 38 is also advantageous because various polymers (e.g., polyurethane) are incompressible fluids. As spring space 36 defined in swivel housing 14 is consumed or filled by spring member 38 when deflected, less and less deflection may take place, until eventually spring member 38 becomes so rigid that little or no more deflection can take place. In various embodiments, this deflection limitation acts as a deflection or dead stop for caster assembly 10.

In various examples of embodiments of operation, both a spring-force adjustment force and an applied force are applied to spring member 38 through and/or in a vertical (i.e., top-to-bottom) direction or dimension of spring member 38. Because the adjustment force axis is the same as, or closely or generally aligned with, the applied force axis in these embodiments, as discussed above, the shape and structure of spring member 38 has a substantial effect on the performance of spring member 38.

As illustrated, in various embodiments, spring space or cavity 36, as well as spring assembly 16 are provided within a diameter, circumference and/or plane of bearing race 44 which is advantageous for a number of reasons, including a savings of vertical space and allowance of more or various features such as a height adjustment mechanism to be provided underneath fork trucks to which one or more caster assemblies 10 are coupled, while maintaining ride heights and/or ride height requirements.

As shown in FIGS. 1-3 and 5-7C, in various embodiments, bent plate or side plate assembly 18 includes a pair of bent or side plates 66 that are coupled (and/or operatively coupled) to bottom portion or eye 50 of eyebolt 48 of spring-force-adjustable and/or height-adjustable spring assembly 16 and mounting structure 46 of swivel housing 14. In various embodiments, bent or side plates 66 carry caster wheel assembly 100.

In various embodiments, wheel assembly 100 includes a first fastener, rod or bolt 68 that extends through a first set of holes or passages defined or provided in bent or side plates 66 and through a hole or passage provided through center of a wheel 102 of caster wheel assembly 100. In various embodiments, first fastener 68 is coupled to a first nut or other securing device to couple it and wheel assembly 100 to side plates 66. In particular, first fastener 68 forms an axel or pivot point around which wheel 102 may rotate. A lubrication fitting may be provided in one end of the first fastener to allow the wheel assembly to be easily lubricated without having to disassemble the industrial caster assembly or remove it from the pallet truck or other object to which caster assembly 10 is coupled.

In various embodiments, a second fastener, rod or bolt 70 extends through a second set of holes or passages defined or provided in bent or side plates 66 and a hole or passage provided in mounting structure 46 of swivel housing 14. In various embodiments, second fastener 70 is coupled to a second nut or other securing device. In various embodiments, second fastener 70 also forms an axel or pivot point around which bent plate or side plate assembly 18 may pivot or rotate (e.g., as height of caster assembly 10 is adjusted, in response to caster wheel 102 travelling over uneven surfaces, across thresholds and other bumps, dips and the like, and/or in response to changes in the load placed on spring-force-adjustable and/or height-adjustable industrial caster assembly 10).

In various embodiments, a third fastener, rod or bolt 72 extends through a third set of holes or passages provided in bent or side plates 66 and through eye or eyelet 50 provided within the bottom portion of rod or eyebolt 48. In various embodiments, third fastener 72 is coupled to a third nut or other securing device to couple it to bent or side plates 66. In various embodiments, third fastener 72 bears against elastomeric spring member assembly 16 and may cause spring member 38 to deform or deflect as bent or side plate assembly 18 pivots or rotates about second fastener 70, and thus forms a spring axel that helps apply a load between caster wheel 102, wheel assembly 100 and/or bent or side plates 66, and spring assembly 16.

As illustrated in FIGS. 1-4 and 6, pre-deflection, pre-loading, or pre-compression/deformation of spring member 38 may be adjusted from access provided in passage 26 and/or above mounting plate 20, according to various examples of embodiments. In various embodiments, pre-tensioning nut or fastener 62 may be rotated about or relative to fitting 54 to draw fitting 54 up or otherwise toward mounting plate 20 to compress, deform or deflect spring member between swivel housing 14 and flange 58 of fitting 54. In various embodiments, pre-tensioning nut or fastener 62 may be rotated relative to fitting 54 to draw fitting 54 down or otherwise away from mounting plate 20 to reduce or remove compression, deformation or deflection of spring member 38.

In various embodiments, height of caster assembly 10 and wheel assembly 100, or the spacing of wheel 102 relative to mounting plate 20 may be adjusted from access provided in passage 26 and/or above mounting plate 20. In various examples of embodiments, spring seat 64 may be rotated relative to rod or eyebolt 48 to draw rod or eyebolt 48 up or otherwise toward mounting plate 20 to rotate or pivot bent or side plate assembly 18 around second fastener 70 to raise wheel 102, reduce or decrease the height of caster assembly 10 and wheel assembly 100, and/or shorten or reduce the spacing of wheel 102 relative to mounting plate 20. In various examples of embodiments, spring seat 64 may be rotated relative to rod or eyebolt 48 to draw rod or eyebolt 48 down or otherwise away from mounting plate 20 to pivot or rotate bent or side plate assembly 18 around second fastener 70 to lower wheel 102, extend or increase the height of caster assembly 10 and wheel assembly 100, or lengthen or extend the spacing of wheel 102 relative to mounting plate 20. In various examples of embodiments, spring seat 64 may be rotated relative to rod 48 using one or more common tools (e.g., an allen wrench and/or pass-through socket).

When mounting base 12 is attached to a pallet truck or the like, spring-force-adjustable and height-adjustable industrial caster assembly 10 supports at least a portion of the load of and on the pallet truck. Depending on the smoothness or unevenness of the surface on or over which the caster assembly and/or pallet truck or the like is moving, and the amount of play desired, spring-force-adjustable and height-adjustable industrial caster assembly 10 may be adjusted so that elastomeric spring member 38 has a higher or lower spring constant (e.g., to provide a stiffer response to loads, such as when cornering around turns, or a springier response to loads, such as when moving over an uneven surface).

When fitting 54 applies a preload force to spring member 38 and/or third fastener 72 applies a static and/or dynamic force to spring member 38 as a load of and/or supported by the device to which caster assembly 10 is attached changes, and/or wheel 102 and assembly 10 travels over a varying surface, in various embodiments, spring member 38 responds by deforming, e.g., shortening in the vertical or top-to-bottom direction, as the load increases and by returning towards its original shape, i.e., lengthening in the vertical or top-to-bottom direction, as the load decreases.

In various embodiments, a torque wrench may be utilized to adjust the pre-deflection of spring member 38 a certain or desired distance or amount. In various examples of embodiments, a torque wrench may be utilized to rotate pre-tensioning nut 62 relative to fitting 54 to move fitting 54 relative to swivel housing 14 to create a certain or approximate pre-deflection in spring member 38.

For example, in various embodiments, the polymer spring member in a caster assembly may require a pre-determined amount of force (or approximate force) to deflect a certain (or approximate) amount. In various embodiments, the amount or approximate amount of force is determined or pre-determined based on the material making up the spring member, the amount of current or existing deflection of the spring member (e.g., caused by the pre-tension nut on the top of the caster), and the internal angle of the cavity or spring space defined by the swivel housing. In various embodiments, the amount of torque required to create that determined or pre-determined amount of force may be determined. The top-access adjusting mechanism may then be adjusted with a certain amount of torque (e.g., using a common tool such as a torque wrench) to create that amount of force and pre-deflection.

As a nonexclusive example to illustrate the torque adjustable or torque setting adjustment feature, it was determined that approximately five hundred pounds of force was needed to deflect an example embodiment of a polymer spring by 0.25". The torque required to create this force was calculated using the following equation:

$$T(\text{Torque required}) = c(\text{coefficient of friction of metals}) \times D(\text{thread diameter}) \times F(\text{Force})$$

Or, more specifically in the example:

$$T = 0.2(0.625 \text{ in})(500 \text{ lbs}) = 62.5 \text{ in/lbs} = 5.2 \text{ ft/lbs torque}$$

In the example, a load cell was placed below the wheel of a caster assembly including an embodiment of the polymer spring member and the adjusting mechanism was adjusted with a torque wrench using 5.2 ft/lbs torque. According to the load cell, the applied load from the 5.2 ft/lbs torque was 550 pounds, or approximately the expected force needed to deflect the spring 0.25".

Figure 7A:
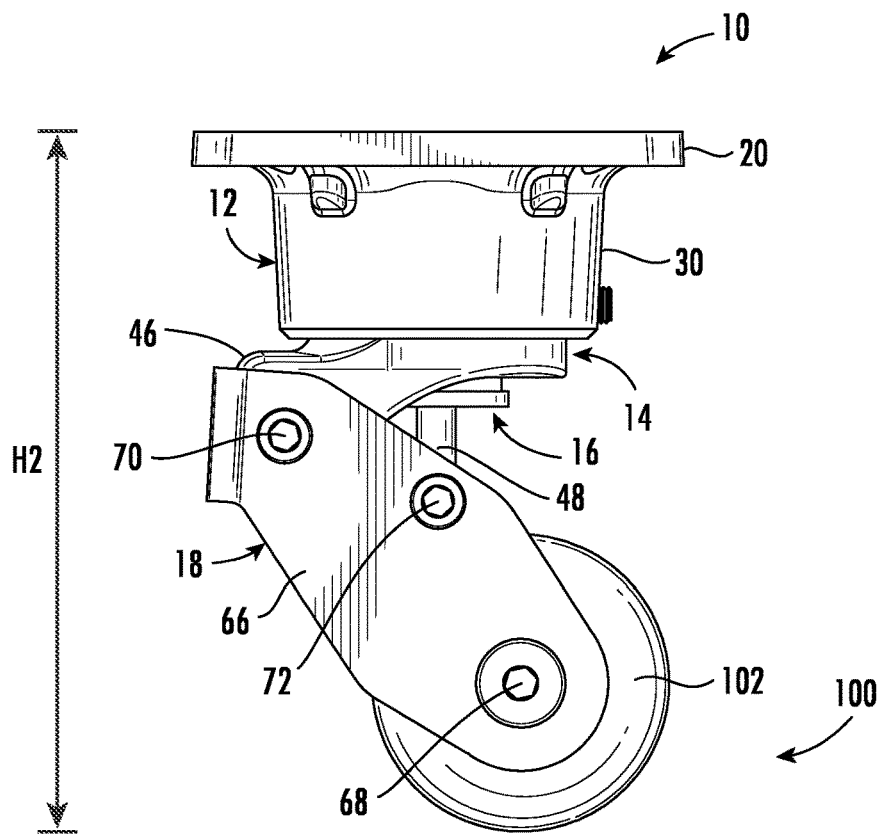
FIG. 7A illustrates a side view of the caster assembly and wheel of FIG. 1 at an extended height, according to various examples of embodiments.
Figure 7B:
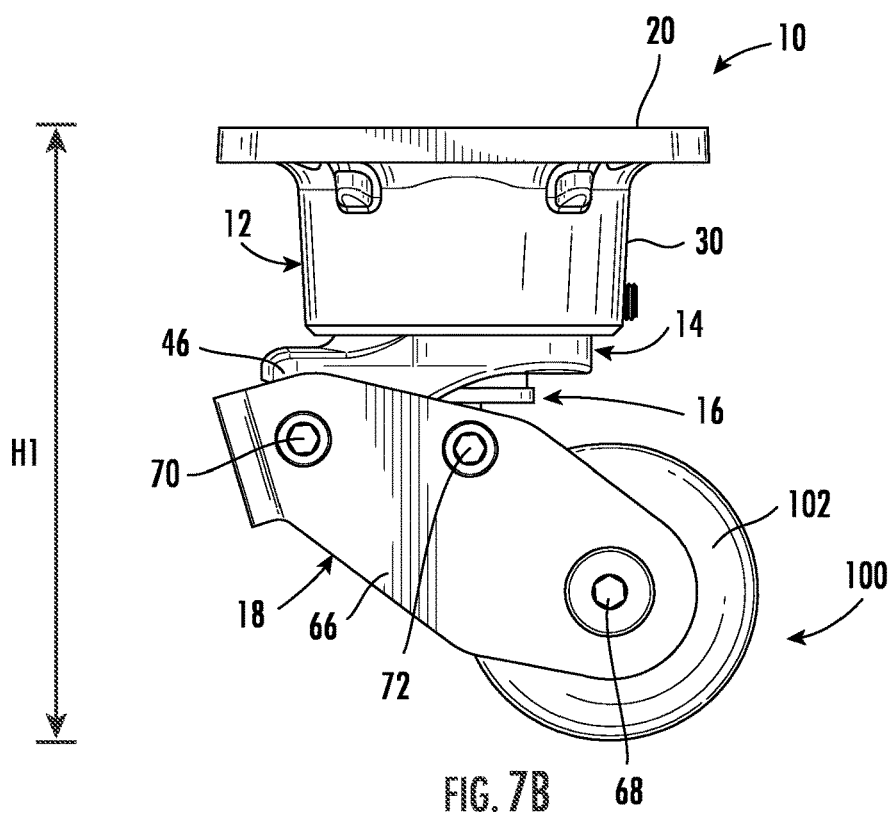
FIG. 7B illustrates a side view of the caster assembly and wheel of FIG. 1 at a retracted height, according to various examples of embodiments.
Figure 7C:
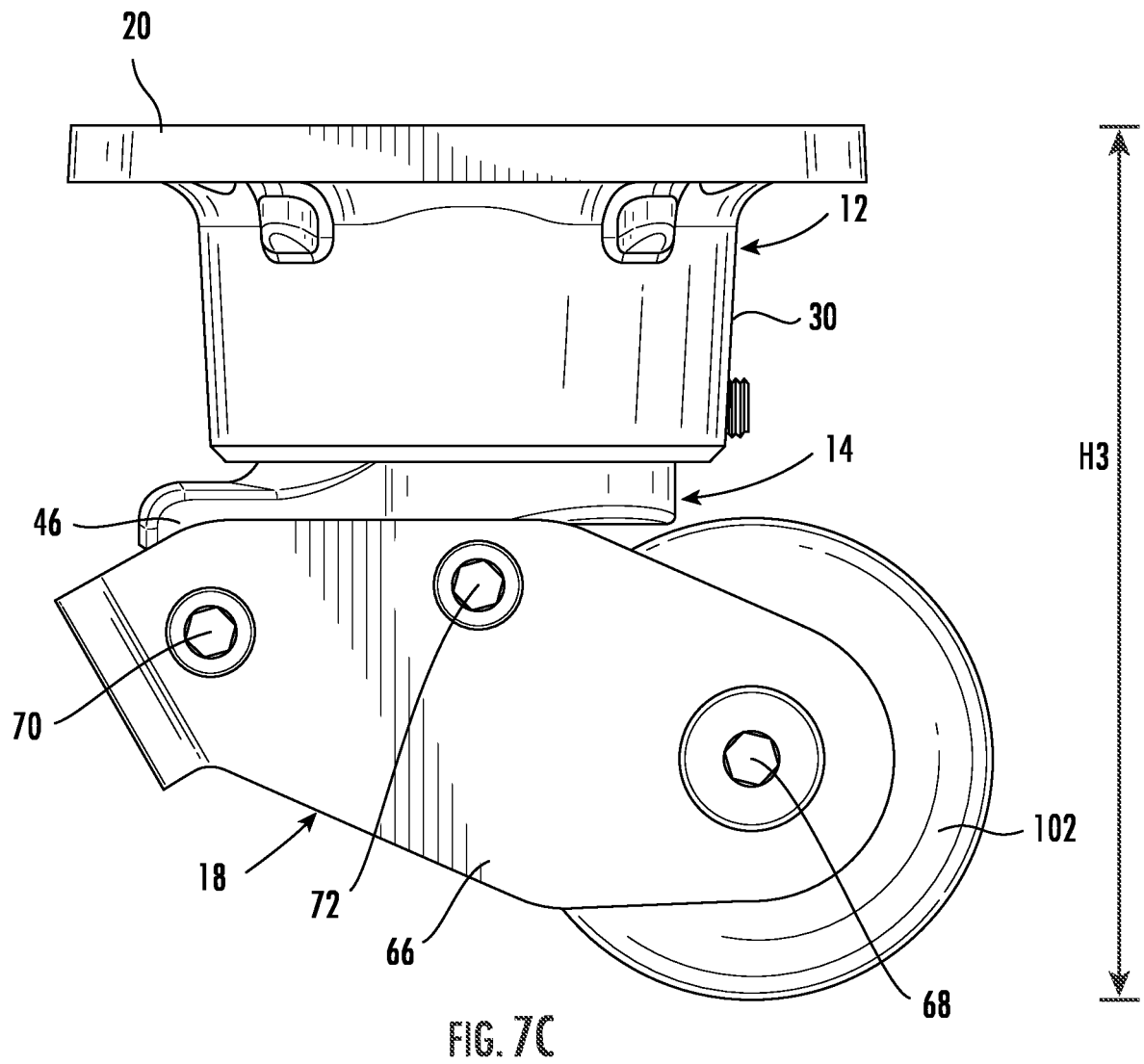
FIG. 7C illustrates a side view of the caster assembly and wheel of FIG. 1 at a fully retracted height, according to various examples of embodiments.

FIGS. 7A-7C help illustrate a range of caster assembly 10 height adjustment according to various examples of embodiments. For example, as illustrated in FIG. 7B, the caster assembly and wheel may be assembled at a first height H1 from bottom of caster wheel to top of mounting plate of about a first dimension (e.g., 9.25 inches). As desired, the height may be increased up to a second height H2 of about a second dimension (e.g., 9.5 inches) as illustrated in FIG. 7A by spinning spring seat 64 coupled to or engaged with the threaded top portion of rod or eyebolt 48 in one direction to move rod 48 of spring assembly 16 (e.g., down or away) relative to swivel housing 14 and/or mounting plate 20. Alternatively or additionally, the height may be decreased down to a third height H3 of about 8.25 inches as illustrated in FIG. 7C by spinning spring seat 64 coupled to or engaged with the threaded top portion of rod or eyebolt 48 in an opposite direction to move rod or eyebolt 48 of spring assembly 16 (e.g., up or toward) relative to swivel housing 14 and/or mounting plate 20.

The various components of the caster assembly may be made with a variety of suitable materials. In various embodiments, the materials and finish are selected to provide optimal or suitable strength and protection against corrosion. In various embodiments, the mounting plate and base are made of iron (e.g., ductile iron). In various embodiments, the side plates, mounting base and plate, and spring seat are zinc plated.

Figure 8:
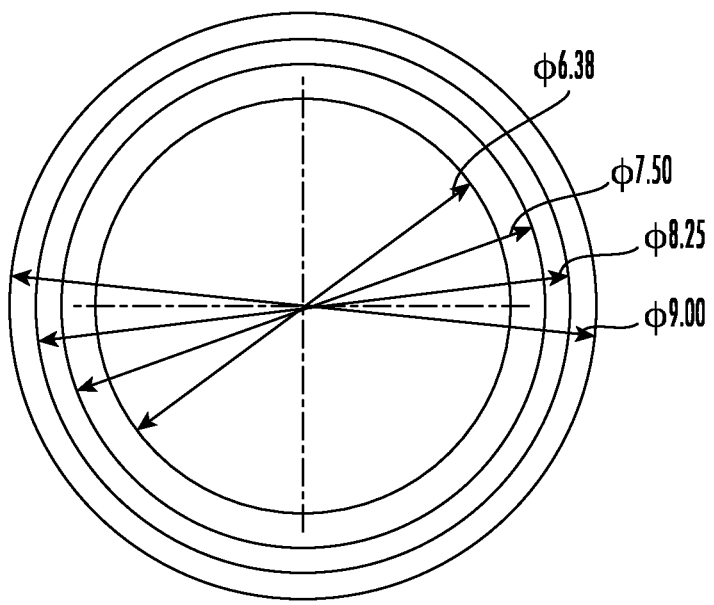
FIG. 8 illustrates a top view dimensional working envelope of a caster assembly and wheel, according to various examples of embodiments.
Figure 9:
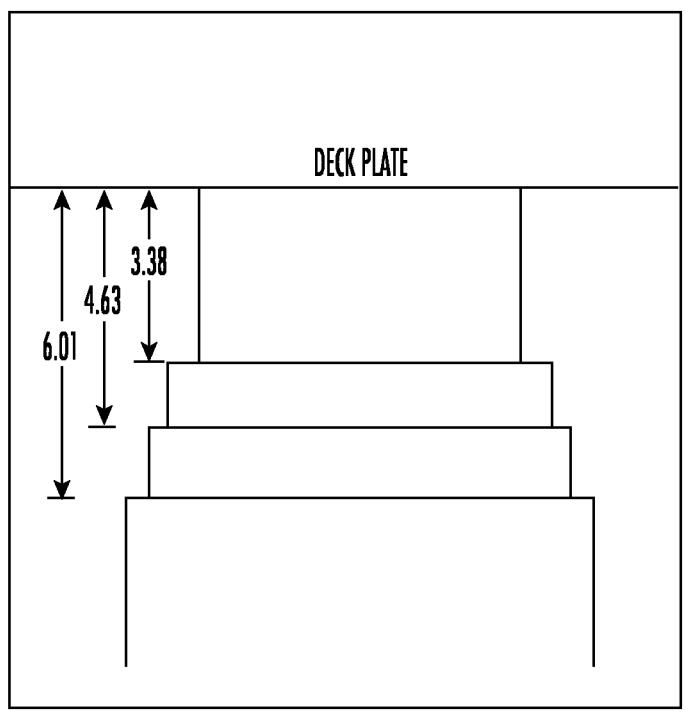
FIG. 9 illustrates a side view of the dimensional working envelope of FIG. 8, according to various examples of embodiments.

FIGS. 8-9 illustrate a dimensional working envelope of the caster assembly and the wheel assembly according to various examples of embodiments. In various embodiments, all parts of the swivel housing remain within this envelope through full swivel at any deflection.

Figure 10:
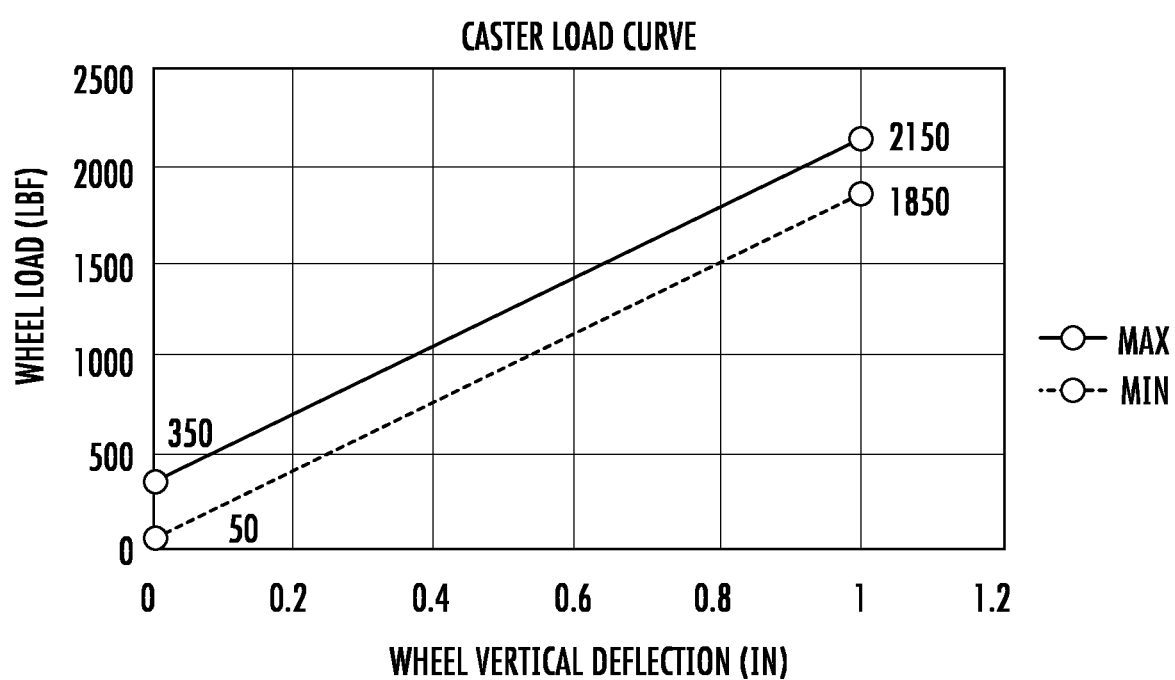
FIG. 10 is a graph plotting exemplary relationships between the load and the deflection provided by a caster assembly and wheel, according to various examples of embodiments.

FIG. 10 is a graph plotting maximum and minimum deflection to load response curves according to various examples of embodiments. In various exemplary embodiments, the desired deflection response can be similar to the top line or the bottom line or along a curve or line between the two lines.

Figure 11:
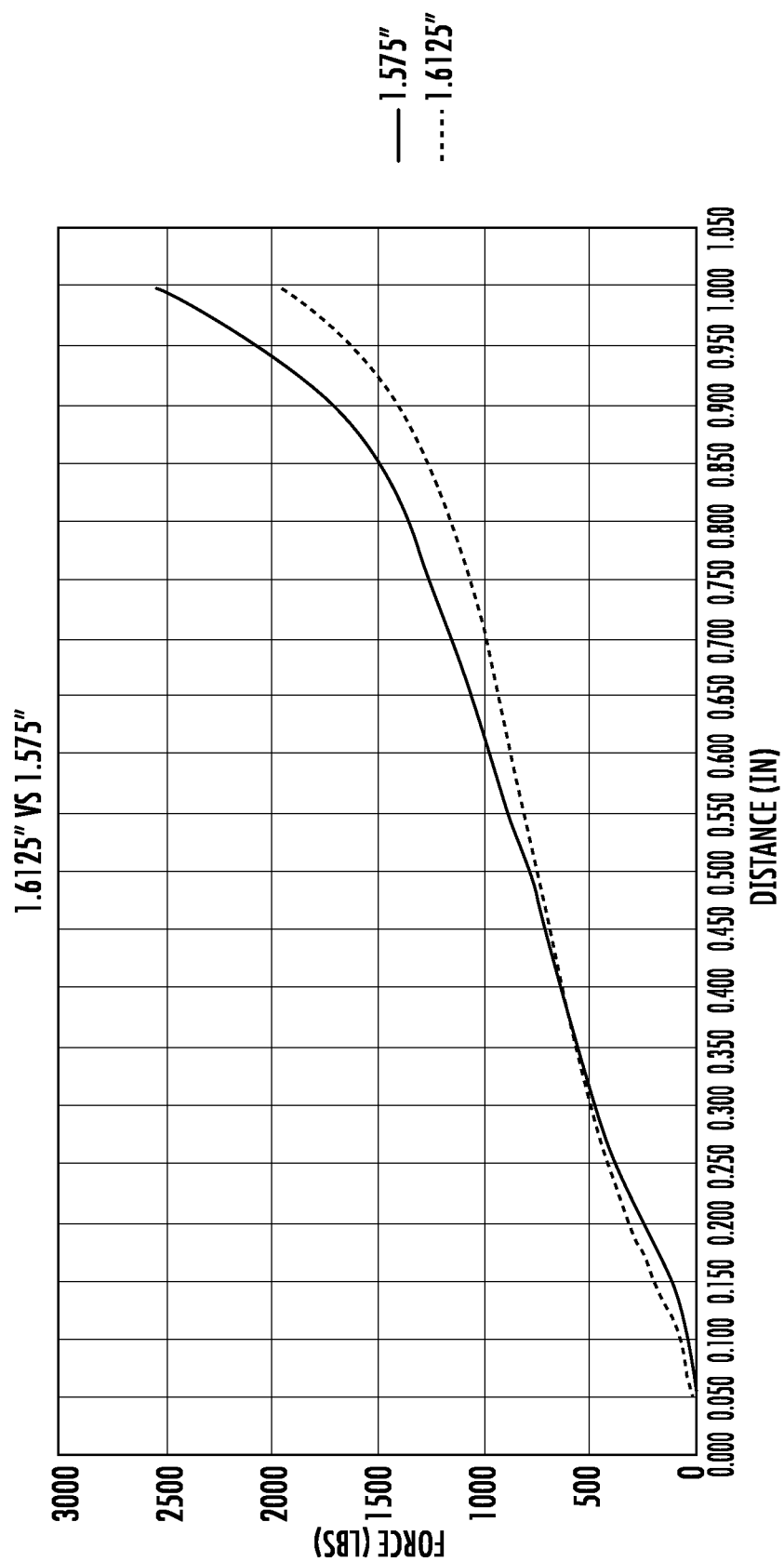
FIG. 11 is a graph plotting exemplary relationships between various loads and the deflection provided by a spring member having an outside diameter of 1.6125 inches and a spring member having an outside diameter of 1.575 inches, according to various examples of embodiments.

FIG. 11 illustrates Instron testing of the spring member of a prototype caster wheel according to this disclosure. As illustrated in FIG. 11, Instron testing of a spring member having an outside diameter of 1.575 inches was more optimal than a spring member having an outside diameter of 1.6125 inches.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom", and/or "up" and "down") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A spring-force-adjustable, height-adjustable industrial caster assembly, comprising: a mounting base attachable to a movable device; a swivel housing rotatably coupled to the mounting base; the swivel housing defining a spring space; a spring assembly provided at least partially in the spring space; a side plate assembly coupled to the spring assembly and pivotably coupled to the swivel housing; whereby the spring assembly comprises a fitting having a flange coupled to a bottom section of an upper portion of the fitting received by and extending at least the length of an elastomeric spring member provided between a top portion of the swivel housing and the flange, whereby the swivel housing defining the spring space constrains lateral deflection of the spring member, and whereby the spring assembly also comprises a rod having a lower portion and an upper portion, the lower portion engaged with a fastener coupled to the side plate assembly and the upper portion having a threaded section engaged with threading of a spring seat.

2. The spring-force-adjustable, height-adjustable industrial caster assembly of claim 1, whereby the upper portion of the fitting extends into a bottom member of mounting base and the upper portion of the fitting comprises a top section having threads engaged by internal threading of a pre-tensioning nut.

3. The spring-force-adjustable, height-adjustable industrial caster assembly of claim 1, whereby the spring space has a conical or frustoconical shape.

4. The spring-force-adjustable, height-adjustable industrial caster assembly of claim 1, whereby the spring member is made from a polymer.

5. The spring-force-adjustable, height-adjustable industrial caster assembly of claim 2, whereby the fitting engages with the pre-tensioning nut to laterally deflect the spring member.

6. The spring-force-adjustable, height-adjustable industrial caster assembly of claim 5, whereby the pre-tensioning nut is engageable using a common tool.

7. The spring-force-adjustable, height-adjustable industrial caster assembly of claim 5, whereby the pre-tensioning nut is engageable using a torque wrench.

8. The spring-force-adjustable, height-adjustable industrial caster assembly of claim 5, whereby the pre-tensioning nut is rotated relative to the fitting until a pre-determined torque value.

9. The spring-force-adjustable, height-adjustable industrial caster assembly of claim 8, whereby the pre-determined torque value corresponds to a certain deflection of spring member.

10. The spring-force-adjustable, height-adjustable industrial caster assembly of claim 5, whereby the mounting base defines a passage extending through a top mounting plate, which passage may be used to view, access and/or rotate the pre-tensioning nut.

11. The spring-force-adjustable, height-adjustable industrial caster wheel of claim 1, whereby the side plate is pivotable relative to the swivel housing by rotating the spring seat relative to the rod to change the distance between the mounting base and a wheel assembly coupled to the side plate assembly.

12. The spring-force-adjustable, height-adjustable industrial caster wheel of claim 11, whereby the spring seat and the rod are engageable using common tools.

13. The spring-force-adjustable, height-adjustable industrial caster wheel of claim 11, whereby the spring seat and the rod are engageable using an allen wrench and a pass through socket.

14. The spring-force-adjustable, height-adjustable industrial caster wheel of claim 1, whereby the mounting base defines a passage extending through a top mounting plate, which passage may be used to view, access and/or rotate the spring seat and/or the rod.

15. The spring-force-adjustable, height-adjustable industrial caster assembly of claim 1, whereby a bearing race having a circumference is formed by a first channel provided in an inner surface of a central passage defined in defined in mounting base and a corresponding channel formed in an outer surface of the swivel housing, and whereby the spring space is provided within the circumference of a plane of the bearing race.

16. A pallet truck comprising a spring-force-adjustable, height-adjustable industrial caster assembly of claim 1.

17. A moveable device comprising a spring-force-adjustable, height-adjustable industrial caster assembly of claim 1.

* * * * *